United States Patent [19]

Perlman et al.

[11] Patent Number: 4,933,978
[45] Date of Patent: Jun. 12, 1990

[54] METHOD AND APPARATUS FOR DETERMINING THE VALUE OF A SAMPLE IN THE MTH POSITION OF AN ORDERED LIST OF A PLURALITY OF SAMPLES

[75] Inventors: Stuart S. Perlman, Princeton; Sanford Eisenhandler, East Windsor; Paul W. Lyons, New Egypt; Michael J. Shumila, Hamilton Square, all of N.J.

[73] Assignee: RCA Licensing Corporation, Princeton, N.J.

[21] Appl. No.: 405,110

[22] Filed: Sep. 11, 1989

Related U.S. Application Data

[63] Continuation of Ser. No. 834,734, Feb. 28, 1986, abandoned.

[51] Int. Cl.$^5$ .............................................. G06K 9/00
[52] U.S. Cl. .................................. 382/41; 364/715.01; 364/724.01; 382/54
[58] Field of Search ......................... 382/36, 41, 52, 54; 358/167; 375/25, 26; 364/715.01, 724.01, 734

[56] References Cited

U.S. PATENT DOCUMENTS

| | | | |
|---|---|---|---|
| 4,313,194 | 1/1982 | Maitre | 375/25 |
| 4,441,165 | 4/1984 | Coleman | 382/34 |
| 4,456,968 | 6/1984 | Carter | 382/36 |
| 4,483,011 | 11/1984 | Brown | 375/25 |
| 4,524,447 | 6/1985 | Willis | 375/26 |
| 4,541,116 | 9/1985 | Lougheed | 382/54 |
| 4,560,974 | 12/1985 | Coleman | 382/36 |
| 4,571,635 | 2/1986 | Mahmoodi | 382/54 |
| 4,597,009 | 6/1986 | Ballmer | 382/52 |
| 4,668,995 | 5/1987 | Chen | 382/52 |
| 4,677,479 | 6/1987 | Hatori | 358/260 |
| 4,682,230 | 7/1987 | Perlman | 358/167 |
| 4,713,786 | 12/1987 | Roskind | 364/715 |

OTHER PUBLICATIONS

R. G. Harber et al.; "VLSI Implementation of a Fast Rank Order Filtering Algorithm;" Mar., 1985; ICASSP 85 Proceedings; pp. 1396–1399.

T. Okada et al., "New Filter Technology in Picture Processing;" Jun. 1982; IEEE ICCE presentation.

N. Demassieux et al.; "VLSI Architecture for a One Chip Video Median Filter;" Mar. 1985; ICASSP 85 proceedings, pp. 1001–1004.

M. P. Ekstrom; "Digital Image Processing Techniques;" 1984; Academic Press, Orlando, Florida, pp. 25–31.

*Primary Examiner*—Leo H. Boudreau
*Attorney, Agent, or Firm*—Joseph S. Tripoli; Eric P. Herrmann; James B. Hayes

[57] ABSTRACT

A method and apparatus for determining the value of a sample having a particular position in an ordered ranking, by magnitude, of a set of digital samples includes means for truncating the lesser significant bits of the samples. Further means compares the values of the truncated samples and generates selection control signals indicating the truncated sample which is in the desired position of an ordered ranking of the truncated samples. A function generator then generates a function of the samples, corresponding to the selected truncated samples.

16 Claims, 5 Drawing Sheets

MSB PROM 50 (FOR MEDIAN)

| CASE | CONDITION | OUTPUTS | | | |
|---|---|---|---|---|---|
| | | MEDIAN | $A_m$ | $B_m$ | $C_m$ |
| 1 | A > B > C | B | 0 | 1 | 0 |
| 2 | A > B = C | B (OR C) | 0 | 1 | 1 |
| 3 | A > B < C < A | C | 0 | 0 | 1 |
| 4 | A > B < C > A | A | 1 | 0 | 0 |
| 5 | A > B < C = A | A (OR C) | 1 | 0 | 1 |
| 6 | A < B > C < A | A | 1 | 0 | 0 |
| 7 | A < B > C > A | C | 0 | 0 | 1 |
| 8 | A < B > C > A | A (OR C) | 1 | 0 | 1 |
| 9 | A < B = C | B (OR C) | 0 | 1 | 1 |
| 10 | A < B < C | B | 0 | 1 | 0 |
| 11 | A = B = C | A (OR B, OR C) | 1 | 1 | 1 |
| 12 | A = B < C | A (OR B) | 1 | 1 | 0 |
| 13 | A = B > C | A (OR B) | 1 | 1 | 0 |

LSB PROM 95

| A | C | OUTPUT SAMPLE |
|---|---|---|
| 0 | 0 | DON'T CARE |
| 0 | 1 | C |
| 1 | 0 | A |
| 1 | 1 | (A+C)/2 |

Fig. 8

METHOD AND APPARATUS FOR DETERMINING THE VALUE OF A SAMPLE IN THE MTH POSITION OF AN ORDERED LIST OF A PLURALITY OF SAMPLES

This is a continuation of application Ser. No. 834,734, filed Feb. 28, 1986 now abandoned.

This invention relates to enhancement of a signal represented by a plurality of digital samples. A method is described below which determines a desired M-tile of a plurality of these digital samples. Apparatus implementing this method is also described.

The development of digital processing has made it possible to process images in a variety of forms. For example, a photograph may be processed in a computer as a two-dimensional array of samples. A video signal, as from a television camera, may be processed as a three-dimensional array of samples—the third dimension being the temporal dimension and representing motion in the image. One filtering algorithm which may be applied in the processing of such images is the median filter.

A median filter reduces impulse-type noise in any signal, but may be particularly efficacious for reducing such noise in an image such as may be caused by a scratch in a photograph or a dropout in the communications channel over which a video signal is transmitted. A median filter does not adversely affect edges or corners which exist in an image, however. In prior median filters, the current sample (the sample being filtered) was replaced by a sample having the median value of the values of that sample and a number of samples surrounding that sample.

The median value of a plurality of samples may be determined by the following method. First, a plurality of samples for which the median value is to be determined, is produced from the input signal. For example, consider a set of samples having values of 2, 5, 4, 8, 1, 3 and 7. Assume the sample having the value 8 is the current sample and the other samples are from points surrounding that sample. Second, the values of the samples are placed in an ordered list. For the above example, the ordered list would be: 1, 2, 3, 4, 5, 7, 8. The median value is the value of the sample in the middle of this list, i.e. value 4. The sample having the median value is the third sample in the original set. Thus, the third sample (value 4) would replace the current sample (value 8).

It is possible for more than one sample to share the median value. For example, for a set of samples having values 5, 2, 7, 9, 4, 5, 5, the ordered list is 2, 4, 5, 5, 5, 7, 9 and the median value is 5. The median value is shared by the 1st, 6th and 7th samples. In a median filter, any of these three samples could be substituted for the current sample.

An enhancement of the median filtering algorithm described above, selectively substitutes the sample having the median value for the current sample only if the value of the current sample lies outside of predetermined thresholds. For example, in a paper "Image Enhancement Using the Median and Interquartile Distance" by Scollar et al. in Computer Vision, Graphics and Image Processing, Vol. 25, pages 236-251 (1984), the difference between the value of the current sample and the median value is compared to a constant times the difference between the upper and lower quartiles (the interquartile distance) of the samples. If the current sample/median difference is greater than the interquartile distance function, then the sample having the median value is substituted for the current sample. To use this algorithm, it is necessary to calculate not only the median value of a set of samples but also the upper and lower quartile values.

The upper and lower quartile values are the values located three-quarters and one-quarter of the way through the ordered list of sample values, respectively. For the above example, the lower quartile value is 2 (at position 2 of the ordered list), and the upper quartile value is 7 (at position 6 of the ordered list). The interquartile distance thus is 7−2 or 5. If the constant by which the interquartile distance is multiplied is one-half, then the threshold is $\frac{1}{2} \times 5$ or $2\frac{1}{2}$. The median value is 4 and the current sample has the value 8. The current sample/median difference is 8−4 or 4. Because the given sample/median difference (4) exceeds the threshold ($2\frac{1}{2}$), the median value is substituted for the value of the current sample.

With the advent of very large scale integrated (VLSI) electronic circuits, it has become possible to process images as they are received (in real time). In a paper "VLSI Architecture For a One Chip Video Median Filter" by Demassiex et al. in Proceedings IEEE International Conference on Acoustics, Speech and Signal Processing, Vol. 3, pages 1001-1004, (1985) such a filter is described. This filter comprises an array of 10,8-bit comparators which sort five 8-bit samples into an ordered list from which one median value may be taken at every clock cycle. Such an array of comparators requires a significant amount of electronic circuitry and takes a significant area on the integrated circuit substrate on which it is fabricated.

The threshold may be calculated from two different M-tiles (a generic term for the value at a particular position in the ordered list of samples, of which the median and upper and lower quartiles are special cases) which may change as a function of some parameter of the signal being filtered. To use this algorithm, it is necessary to calculate the median and some other upper and lower M-tile values.

It is desirable to be able to extract a sample having any desired M-tile value, for example, the median and upper and lower quartiles, of a set of input samples with a minimum of electronic circuitry and requiring a minimum amount of area on an integrated circuit substrate.

In accordance with the principles of the present invention, a sample having substantially the median value of a set of samples is derived from truncated versions of the input samples. Circuitry processing the truncated samples will operate in real time and require less circuitry than the circuits in the above-mentioned articles.

The method in accordance with the principles of the present invention comprises the following steps. First, a set of digital samples, each represented by a predetermined number of bits, is produced. Second, truncated versions of the set of digital samples are compared to determine which of the truncated versions have the desired M-tile value of the truncated versions. Third, a function of the full bitwidth digital samples corresponding to the truncated versions having the desired M-tile value of the truncated versions is generated to represent substantially the desired M-tile of the full bitwidth samples.

Apparatus in accordance with the present invention comprises a producer of a set of digital samples each represented by a predetermined number of bits. Further means, coupled to said sample producer, compares truncated versions of the set of digital samples and produces respective selection control signals indicating that the corresponding truncated version has the desired M-tile of the truncated samples. A means, coupled to the sample producer and the comparing means, generates a function of the digital samples corresponding to the selected truncated versions as substantially the desired M-tile of the full bitwidth digital samples.

In the figures, multibit digital signal lines are illustrated as a single line with a slash through it and a number indicating the number of bits. This may be implemented as a number of parallel connections each carrying a single bit. In addition, when a subset of the number of bits in the multibit signal are extracted and coupled to a different location, this is indicated by a line curving away from the full bitwidth signal line. The number of bits again is illustrated with a slash and a number as above and an indication is given of whether the bits extracted are the more significant bits (MSB) or lesser significant bits (LSB) of the full bitwidth signal.

Figure 1:
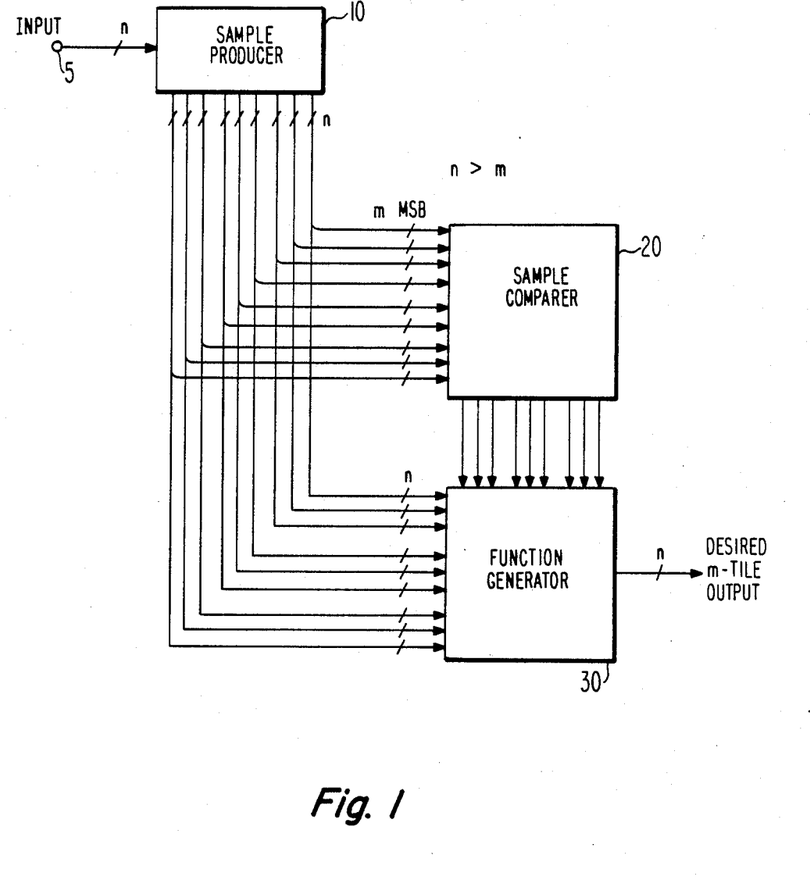
FIG. 1 is a block diagram of apparatus for determining a digital sample which has substantially the desired M-tile value in accordance with the principles of the present invention.

In FIG. 1, digital video input samples from, for example, an analog-to-digital converter located in the front end of a digital television receiver (not shown) are applied to an input terminal 5. The input samples, assumed to be multibit digital samples having a bitwidth of n-bits, are coupled to a sample producer 10. Sample producer 10 produces a set of samples including an n-bit sample currently under examination and eight further samples. The sample currently under examination represents a current point in an image represented by the input digital video signal and the eight further samples represent points surrounding the current point. The surrounding points may be adjacent to the current point vertically, horizontally, temporally (i.e. from adjacent frames) or any combination of these. The sample producer 10 may be, for example, a tapped delay line with taps arranged to provide samples from the desired points in the image.

A set of truncated versions of the digital samples comprising the m most significant bits (MSBs) of each of the nine full bitwidth samples are coupled to a sample comparer 20. Each of the full bitwidth samples are also supplied to a function generator 30. Nine selection control signals (one corresponding to each input sample) from sample comparer 20 are coupled to control inputs of function generator 30. The output of function generator 30 is an n-bit sample which has substantially the desired M-tile value of the nine samples output from sample producer 10.

In operation, sample comparer 20 compares the truncated m-bit versions of the input samples from sample producer 10 with each other. If a particular truncated sample being compared satisfies the criterion (relating to its position in an ordered list) for the desired M-tile, sample comparer 20 produces a selection signal indicataing that the corresponding truncated sample has the desired M-tile value.

Consider a set of nine samples. Because, as described above, the median value is the value in the fifth (middle) position of a list of samples ordered by value, there are four samples having values greater than or equal to the sample having the median value, and four samples having values less than or equal to the sample having the median value. If a sample has five or more other samples having values less than its value, then that sample cannot be fifth sample in the ordered list of nine samples. Also, if a sample has five or more other samples having values greater than its value, then that sample also cannot be the fifth sample in the ordered list of nine samples.

Function generator 30 generates a function of the n-bit samples from sample producer 10 which is determined by the selection control signals from sample comparer 20. For example, if signal comparer 20 indicates that the fourth truncated sample of a group of nine truncated samples has the median value of the truncated samples, then the full bitwidth sample corresponding to the fourth truncated sample may be output through function generator 30. The output of function generator 30 is substantially the median value of the full bitwidth samples from sample producer 10.

If signal comparer 20 indicates that both the fourth and seventh truncated samples share the median value of the truncated samples, then a function of the full bitwidth samples corresponding to the fourth and seventh truncated samples is generated by function generator 30 as substantially the median value. The function may, for example, be the average of the full bitwidth samples corresponding to the selected truncated samples.

Alternatively, function generator 30 may merge a predetermined bit pattern with a truncated sample having the median value to generate an output sample having the n-bit bitwidth required. In this instance, the m-bit truncated sample having the median value may form the m most significant bits of the output sample. Zero values may be supplied to the n-m least significant bit position of the output sample to form an n-bit sample.

Figure 2:
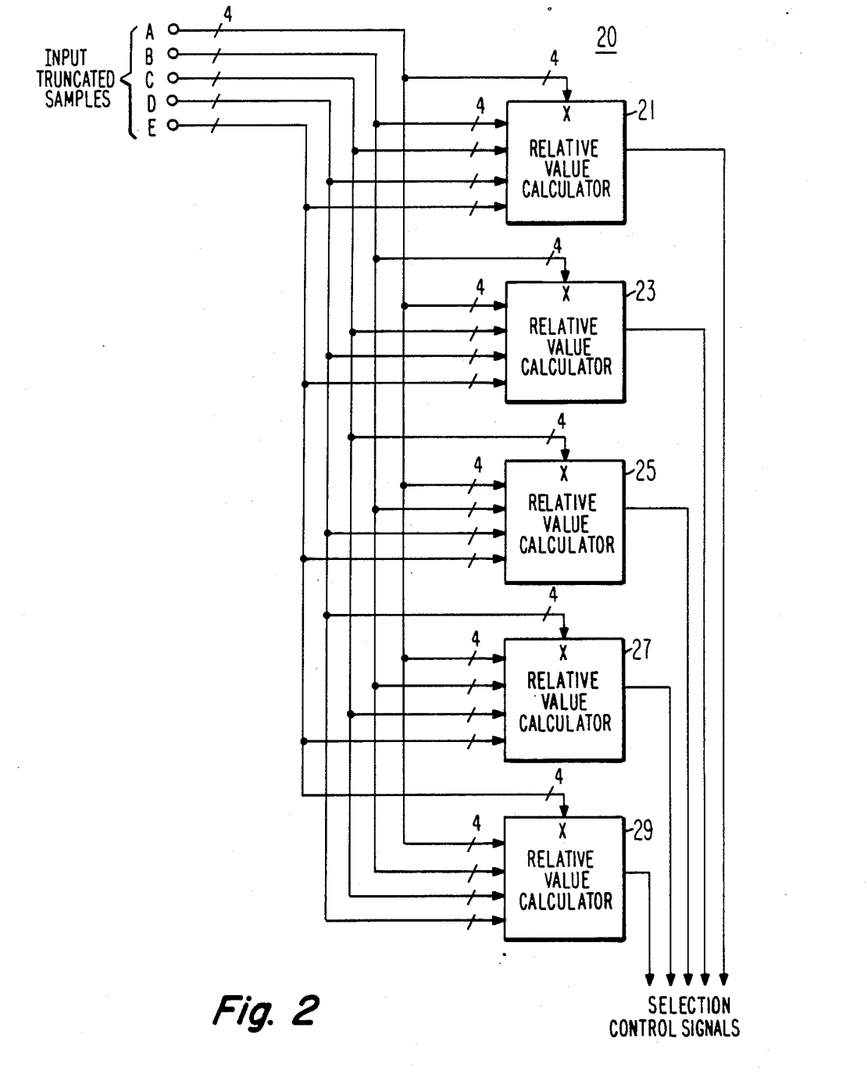
FIG. 2 is a block diagram of a sample comparer which may be used in the apparatus illustrated in FIG. 1.

FIG. 2 illustrates a particular sample comparer 20 which may be used in accordance with the present invention. In FIG. 2, the desired M-tile is the median. For ease of description, five 8-bit input samples are used instead of the nine n-bit illustrated in FIG. 1. It should be understood that the sample comparer 20 illustrated in FIG. 2 may be expanded to process any number of truncated samples, the truncated samples may have any number of bits (less than the bitwidth of the input samples) and any desired M-tile may produce an indication.

In FIG. 2, the five truncated input samples from sample generator 10 of FIG. 1 are applied at input terminals A through E. Input terminals A through E are coupled to input terminals of each of five relative value calculators 21 through 29. A first input terminal X of each relative value calculator 21 through 29 receives a mutually different truncated sample. The other four input terminals of each relative value calculator 21 through 29 receive the truncated samples from the other input terminals A-E. The output of each relative value calculator is a selection control signal which, for example, may exhibit a logic "1" if the truncated sample at the first input terminal X has the median value of all of the truncated samples and exhibits a logic zero otherwise. The selection signals are supplied to function generator 30 of FIG. 1.

Figure 3:
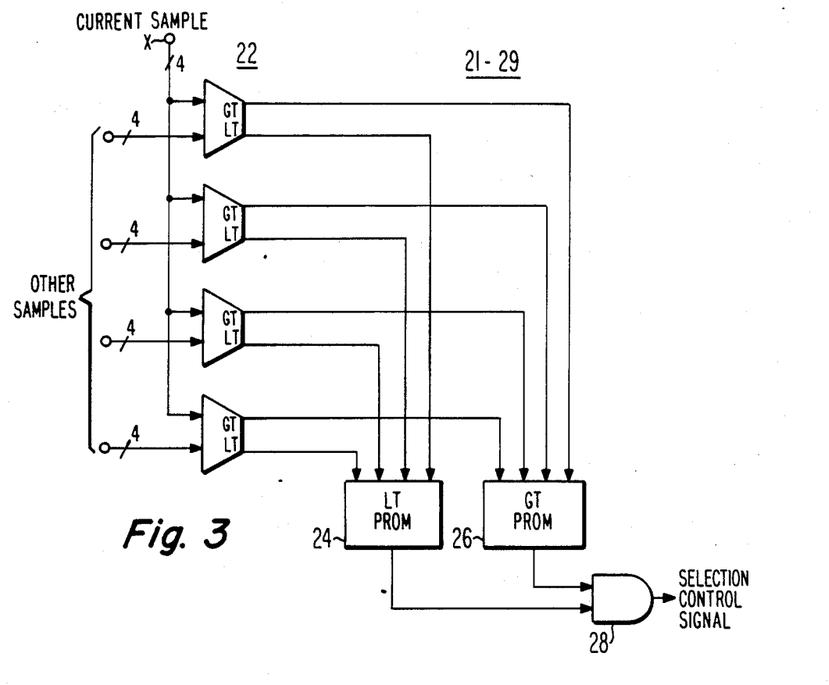
FIG. 3 is a block diagram of a relative value calculator which may be used in the sample comparer illustrated in FIG. 2.

FIG. 3 illustrates one possible embodiment of the relative value calculators (21-29) illustrated in FIG. 2. The truncated sample whose relative value is to be calculated is designated as the given sample and is applied at a first input terminal X. The other four truncated samples are applied to the other input terminals. The truncated sample applied to input terminal X is coupled to respective first inputs of four comparators 22. Each of the other four input terminals is coupled to a respective second input terminal of the comparators 22. Each of the four comparators 22 produces a greater than (GT) and a less than (LT) signal. The four LT signals from comparators 22 are coupled to address input terminals of an LT PROM 24; the four GT signals from comparators 22 are coupled to address input terminals of a GT PROM 26.

The single bit output terminals from PROMs 24 and 26 are coupled to respective input terminals of an AND gate 28. The output signal provided by AND gate 28 indicates whether or not the truncated sample applied to terminal X has the median value of the five truncated samples.

In operation, each of comparators 22 compares the given truncated sample coupled to its first input terminal to the other truncated sample coupled to its second input terminal. If the value of the given sample is greater than that of the other sample, the GT output supplies a logic "1" signal to PROM 26, and a logic "0" signal otherwise. If the value of the given sample is less than that of the other sample, the LT output supplies a logic "1" signal to PROM 24, and a logic "0" signal otherwise.

PROM 24 is preprogrammed to output a logic "1" if the number of other samples which have values less than that of the given sample satisfies the criterion for the desired M-tile. That is, if the desired M-tile is the median, then no more than half (i.e. 2) of the other samples can have values less than that of the given sample. PROM 24 is thus preprogrammed to generate a logic "1" whenever two or more of the PROM address bits are ascertained to exhibit logic "0" signals. A similar situation exists for PROM 26: no more than half of the other samples can have values greater than that of the given sample if the sample at terminal X has the median value. PROM 26 is preprogrammed to produce a logic "1" output whenever two or more of its address input bits are ascertained to exhibit logic "0" signals.

Figure 4:
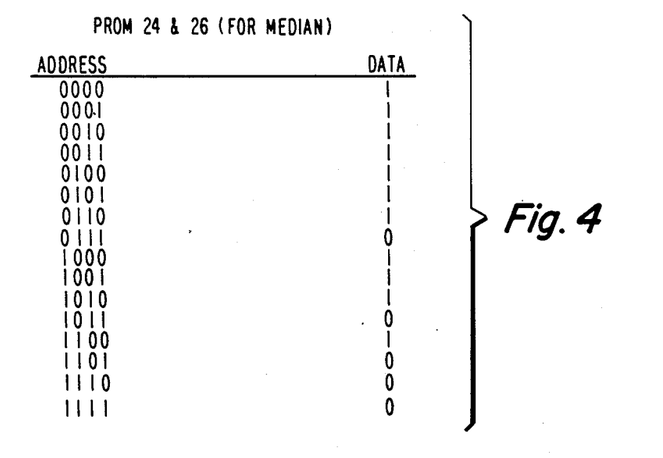
FIGS. 4, 6 and 8 are tables describing the operation of various circuit elements illustrated in the block diagrams in FIGS. 3, 5, and 7.

FIG. 4 is a table illustrating the data preprogrammed in PROMs 24 or 26 in order to indicate that the given sample has the median value of the truncated samples. The data generated is a logic "1" signal where two or more address input bits are logic "0" signals.

Referring again to FIG. 3, if both PROMs 24 and 26 generate logic "1" signals, indicating that both the "less than" and "greater than" criterion have been satisfied, then AND gate 28 will generate a logic "1" signal. This indicates that the sample at input terminal X has the median value of the truncated samples.

Figure 5:
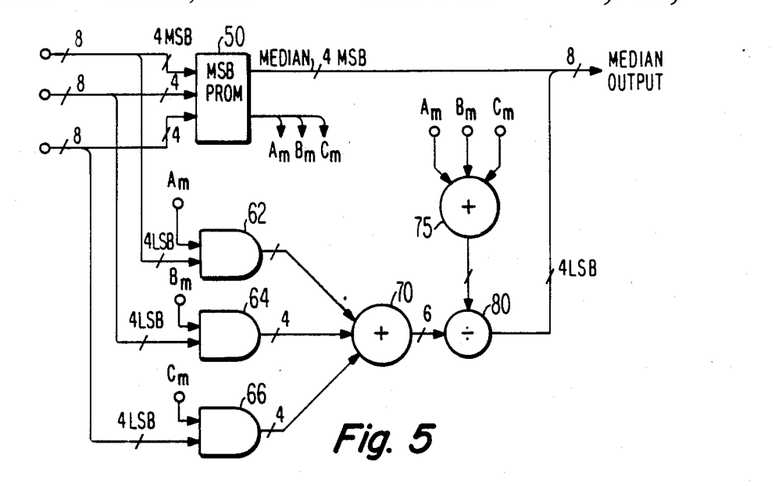
FIG. 5 is a block diagram of an alternative embodiment of a sample comparer and function generator which may be used in the apparatus illustrated in FIG. 1.

FIG. 5 illustrates an alternative median value determiner for a case when three samples form the set of samples, and each truncated sample is represented by four bits. This embodiment combines the sample comparer 20 and function generator 30 in common circuitry.

In FIG. 5, 8-bit samples from sample producer 10 of FIG. 1 are applied to input terminals A, B and C. The four most significant bits from each of the input terminals are coupled to respective address input terminals of MSB PROM 50. MSB PROM 50 produces at four data output terminals a four bit truncated sample having the median value of the input truncated samples. This truncated sample forms the four most significant bits of the 8-bit median value output sample.

Residual samples formed by, for example, the four least significant bits of the 8-bit input samples from input terminals A, B and C are coupled to first input terminals of respective AND gates 62 through 66. It should be understood that the residual sample may have any number of lesser significant bits. Output terminals of AND gates 62 through 66 are coupled to respective input terminals of a summing element 70. The output terminal of summing element 70 is coupled to a dividend input terminal of a divider 80. The four bit sample from a quotient output terminal of divider 80 is merged with the median valued truncated sample from MSB PROM 50 to form the 8-bit median valued output sample.

MSB PROM 50 also produces single bit selection control signals Am, Bm and Cm at three data output terminals. Each of these signals is a logic "1" signal if the truncated sample at the corresponding input terminal of MSB PROM 50 has the median value, and a logic "0" signal otherwise. Control signals Am, Bm and Cm are coupled to second input terminals of AND gates 62 through 66, and to respective input terminals of a summing element 75. An output terminal of summing element 75 is coupled to a divisor input terminal of divider 80.

Figure 6:
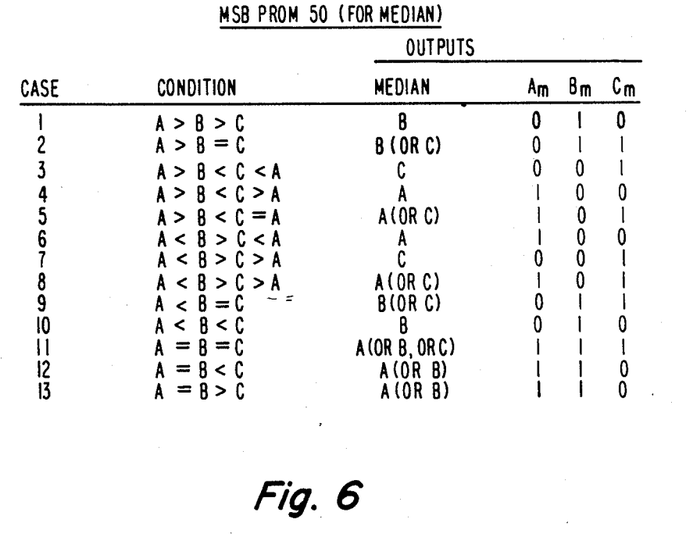

MSB PROM 50 is preprogrammed as illustrated in FIG. 6. There are 13 possible cases of relative values for three input samples. The cases and the relative value conditions are listed in FIG. 6. The MSB PROM 50 input terminal whose truncated sample is produced at the median data output terminal of MSB PROM 50, and the values of selection control signals Am, Bm and Cm are also listed for each case.

For example, for case 1, the value of the truncated sample at input terminal A is greater than the value of the truncated sample at input terminal B; and the value of the sample at input terminal B is greater than the value of the sample at input terminal C. The truncated sample from input terminal B has the median value of the three truncated samples. MSB PROM 50 thus produces at its median data output a truncated sample having the value of the truncated sample from input terminal B, as supplied to its address input terminals. MSB PROM 50 also produces the selection control signals Am, Bm and Cm having logic signals "0", "1" and "0" respectively, indicating that only truncated sample B has the median value of the truncated samples.

The AND gates 62 through 66, summing elements 70 and 75 and divider 80 cooperate to generate a four bit sample which has the average value of the residual samples which correspond to the truncated samples having the median value of the truncated samples.

AND gates 62 through 64 act as gates controlled by the selection control signal coupled to their second input terminals. If the selection control signal is a logic "1" signal, then the signal at the first input terminal is coupled to the output terminal. If the selection control signal is a logic "0" signal, then a sample having a value of 0 is produced at the output terminal. Each of AND gates 62 through 66, thus, produces a sample having the value of the input residual sample if the corresponding truncated sample has the median value of the truncated samples, and having the value 0 otherwise. AND gates 62 through 64 may, for example, comprise four two-input AND gates having their respective first inputs coupled to mutually different bits of the residual sample and each having their second input coupled to receive the selection control signal.

Summing element 70 produces at its output terminal a sample having the value of the sum of the output samples from AND gates 62 through 66. This is the sum of the residual samples whose corresponding truncated samples have the median value of the truncated samples.

Divider 80 divides the output of summing element 70 by a dividing factor derived from control signals Am, Bm and Cm in summing element 75. The dividing factor is the number of truncated samples which have the median value of the truncated samples. The output of divider 80, thus, is the average of the residual samples corresponding to the truncated versions having the median value of the truncated values.

Figure 7:
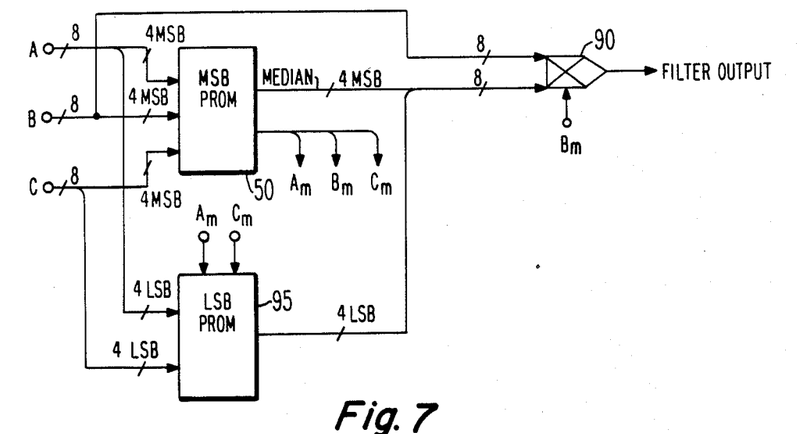
FIG. 7 is a block diagram of median filter constructed according to the principles of the present invention.

If an image is being processed by the median filter and three image points are being filtered, and the truncated versions of the set of three samples are each represented by four bits, then a median filter including a further simplification of the median detector illustrated in FIG. 5 is possible. In an image processor, each point in the image is filtered by taking the median of that point and other points surrounding that point. In the above example, a current point and two points on either side of the current point (either vertically, horizontally, temporally, or some combination) are median filtered. It is assumed that if the truncated sample representing the current point has the median value of the truncated samples, then the full bitwidth sample representing the current point is generated as the median filtered output sample, whether or not any other truncated sample shares the median value with it. If the truncated sample representing the given point does not have the median value, then the average of the input samples whose truncated versions do share the median value is generated as the median filtered output sample. FIG. 7 illustrates an embodiment which will perform this form of median filtering. Elements in FIG. 7 which are similar to those illustrated in FIG. 5 are numbered the same and operate in the same manner.

In FIG. 7, the input sample representing the current point is applied at input terminal B. The samples representing the points surrounding the current point are applied at terminals A and C. The most significant bits from input terminals A, B and C are coupled to address input terminals of MSB PROM 50 (as in FIG. 5). The median data output of MSB PROM 50 forms the most significant bits of a sample applied at a first input terminal of a multiplexer 90. The full bitwidth sample from input terminal B is coupled to a second input terminal of multiplexer 90. The output terminal of multiplexer 90 produces the median filtered sample representing the current point in the image.

MSB PROM 50 also produces selection control signals Am, Bm and Cm as illustrated in FIG. 5 and listed in FIG. 6. Selection control signal Bm is coupled to a control input of multiplexer 90. If selection control signal Bm is a logic "1" signal, then the sample at input terminal B is coupled to the output terminal of multiplexer 90 (regardless of the value of the other control signals), otherwise the median value sample formed by MSB PROM 50 and LSB PROM 95 is coupled to the output terminal of multiplexer 90.

Figure 8:
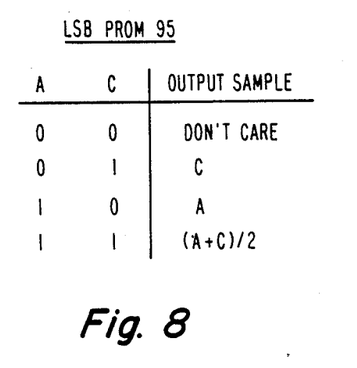

The residual or LSB portions of the samples from input terminals A and C are coupled to address input terminals of LSB PROM 95. In addition, selection control signals Am and Cm are coupled to further address input terminals of LSB PROM 95. LSB PROM 95 is preprogrammed as shown in the table of FIG. 8. If selection control signals Am and Cm are both logic "0" signals, then selection control signal Bm must be a logic "1" signal. In this case, multiplexer 90 couples the sample at input terminal B to the output terminal and the output of LSB PROM 95 is ignored. If selection control signal Am is a logic "0" signal and selection control signal Cm is a logic "1" signal, then a sample having the value of the residual sample from input terminal C is produced at the data output terminal of LSB PROM 95. If selection control signals Am and Cm are logic "1" and "0" signals respectively, a sample having the value of the residual sample from input terminal A is produced. If both selection control signals Am and Cm are logic "1" signals, then a sample having the average value of the residual samples at input terminals A and C is produced at the data output terminals. The output samples from LSB PROM 95 is merged with the most significant bits from MSB PROM 50 to form a median valued output sample.

The filter illustrated in FIG. 7 may be further enhanced by substituting the median valued sample for the current sample only if the current sample exceeds predetermined thresholds. For example, the system described in the above-mentioned paper by Scollar performs the substitution only if the current sample/-median distance exceeds the value of the interquartile distance. MSB PROM 50 may be preprogrammed to perform this thresholding operation and thus, generate the Bm selection control signal unless the threshold is exceeded. A system including this thresholding operation is more efficacious for reduction of impulse noise in the image.

Although the illustrated embodiments described relate primarily to filtering a video image, it should be understood that any signal subject to contamination by impulse noise may be median filtered advantageously.

What is claimed is:

1. A method for processing a sampled data signal occurring as a sequence of n-bit digital samples (n an integer), comprising:
   providing n-bit digital samples representing said sampled data signal;
   truncating said n-bit digital samples to remove R (an integer less than n) lesser significant bits of each sample and producing truncated samples of (n−R)-bits, and (n−R) being greater than one;
   providing respective groups of said truncated samples to sample selection apparatus of the type for determining ones of said truncated samples having values which correspond to a desired M-tile of a respective group of said truncated samples;
   generating an n-bit output sample substantially representing an average value of n-bit digital samples corresponding to said ones of said truncated samples for each respective group of truncated samples; and providing successively generated output samples as an output signal.

2. The method of claim 1 wherein said step for determining ones of said truncated samples having values which correspond to a desired m-tile comprises the steps of:

calculating the relative value of each truncated sample compared with every other truncated sample; and evaluating the calculated relative values for each truncated sample to determine if the value of said truncated value has the relative position of said desired M-tile.

3. The method of claim 1 wherein said step for determining ones of said truncated samples having values which correspond to a desired M-tile comprises the steps of:

predetermining for every possible value of each truncated sample a result which identified which of the truncated samples have the desired M-tile value; and generating said predetermined result in response to the values of truncated samples corresponding to digital samples of each respective group.

4. The method of claim 3, including the further steps of:

predetermining for every possible value of each truncated sample a further result which is a truncated sample having the desired M-tile value; and generating said desired M-tile valued truncated sample in response to the values of truncated samples corresponding to digital samples of each respective group.

5. A method for processing a sampled data signal occurring as a sequence of n-bit digital samples (n an integer), comprising:

truncating said n-bit digital samples to remove R (an integer less than n) lesser significant bits of each sample and producing truncated samples of (n−R)-bits, and (n−R) being greater than one;

providing respective groups of said truncated samples to sample selection apparatus of the type for determining ones of said truncated samples having values which correspond to a desired M-tile of a respective group of said truncated samples;

averaging n-bit digital samples corresponding to said ones of said truncated samples having values which correspond to the desired M-tile of said truncated samples to provide an output sample for each respective group; and providing successively generated output samples as an output signal.

6. A method for processing a sampled data signal occurring as a sequence of n-bit digital samples (n an integer), comprising:

truncating said n-bit digital samples to remove R (an integer less than n) lesser significant bits of each sample and producing truncated samples of (n−R)-bits, and (n−R) being greater than one;

providing respective groups of said truncated samples to sample selection apparatus of the type for determining ones of said truncated samples having values which correspond to a desired M-tile of a respective group of said truncated samples;

merging one of said ones of said truncated samples with a predetermined bit pattern in order to generate an output sample having n-bits; and providing successively generated output samples as an output signal.

7. Apparatus for filtering a signal represented by a sequence of n-bit digital samples, (n an integer) said apparatus comprising:

means responsive to said n-bit digital samples for generating truncated samples from said n-bit digital samples, said truncated samples being (n−R)-bit samples where R is an integer less than n, the (n−R)-bits of the truncated samples correspond to the more significant bits of said n-bit digital samples and (n−R) is greater than one;

M-tile producing means, coupled to said means for generating truncated samples and responsive to respective groups of truncated samples for determining ones of said truncated samples in each respective group having values corresponding to a desired M-tile of said truncated samples and producing respective selection control signals indicating said ones of said truncated samples having the desired M-tile;

means, responsive to said selection control signals, for generating a further digital sample for each respective group, said further digital sample substantially representing an average of n-bit digital samples corresponding to said indicated truncated samples, and wherein a sequence of said further digital samples represent a filtered output signal.

8. Apparatus of claim 7, wherein said M-tile producing means includes a digital memory means having respective address input terminals responsive to said truncated samples and respective output terminals for producing said selection control signals, said digital memory means being preprogrammed to generate said selection control signal corresponding to said truncated samples representing said desired M-tile value.

9. Apparatus of claim 7 wherein said M-tile producing means comprises:

a plurality of comparing means each comparing the value of a truncated sample to values of mutually different other truncated samples within a respective group, for generating a signal indicating whether said truncated sample is greater than or less than said other truncated sample; and means responsive to said plurality of indication signals generated by said comparing means, for producing said selection control signal if the number of greater-than indications and less-than indications are ascertained to be within predetermined limits.

10. Apparatus of claim 9, wherein:

each of said plurality of comparing means comprises a comparator having a first input terminal responsive to a truncated sample, a second input terminal responsive to a mutually different other truncated sample, a first output terminal for indicating that the value of the signal at said first input is greater than that at said second input, and a second output terminal for indicating that the value of the signal at said second input is greater than that at said first input; and said selection signal producing means comprises first means coupled to said first output terminals of said plurality of comparators for generating an output signal having a first state if the number of values of said other truncated samples greater than said truncated sample is ascertained to be fewer than a first predetermined number and a second state otherwise, second means responsive to said second output terminals of said plurality of comparators for generating an output signal having a first state if the number of values of said other truncated samples less than said truncated sample is ascertained to be fewer than a second predetermined number and a second state otherwise, and an AND gate having respective input terminals responsive to the output signals from said first and second means and having an output terminal for generating said selection control signal when the signals at both inputs are in said first state.

11. Apparatus of claim 10, wherein said first and second signal generating means comprise first and second digital memory means respectively, each having address input terminals coupled to said plurality of first and second output terminals respectively of said comparators and respective output terminals coupled to said input terminals of said AND gate.

12. Apparatus for filtering a signal represented by a sequence of n-bit digital samples, (n an integer) said apparatus comprising:

means responsive to said n-bit digital samples for generating truncated samples from said n-bit digital samples, said truncated samples being (n−R)-bit samples where R is an integer less than n, the (n−R)-bits of the truncated samples correspond to the more significant bits of said n-bit digital samples and (n−R) is greater than one;

M-tile producing means, coupled to said means for generating truncated samples and responsive to respective groups of truncated samples for determining ones of said truncated samples in each respective group having values corresponding to a desired m-tile of said truncated samples and producing respective selection control signals indicating said ones of said truncated samples having the desired M-tile;

means for generating the average of n-bit digital samples corresponding to said ones of said truncated samples within a respective group, and generating an output sample for each respective group; and means for providing successively generated output samples as a filtered output signal.

13. Apparatus for filtering a signal represented by a sequence of n-bit digital samples, (n an integer) said apparatus comprising:

means responsive to said n-bit digital samples for generating truncated samples from said n-bit digital samples, said truncated samples being (n−R)-bit samples where R is an integer less than n, the (n−R)-bits of the truncated samples correspond to the more significant bits of said n-bit digital samples;

M-tile producing means, coupled to said means for generating truncated samples and responsive to respective groups of truncated samples for determining ones of said truncated samples in each respective group having values corresponding to a desired m-tile of said truncated samples and producing respective selection control signals indicating said ones of said truncated samples having the desired M-tile;

means responsive to n-bit digital samples corresponding to said ones of said truncated samples, for providing residual samples corresponding at least to the lesser significant bits of said n-bit digital samples;

means responsive to residual samples and said selection control signals for producing a residual sample having the average value of residual samples corresponding to said ones of said truncated samples; and means for merging one of said ones of said truncated samples and said residual sample having said average value to form an output digital sample; and means for providing successively generated output digital samples as a filtered output signal.

14. Apparatus of claim 13, further including means for providing said one of said ones of said truncated samples comprising a digital memory means having respective address input terminals responsive to said truncated samples, and having data output terminals, said memory means being preprogrammed to produce, at said data output terminals, a sample having a value corresponding to the value of said one of said ones of said truncated samples which sample is merged with said residual sample.

15. Apparatus of claim 14, wherein said average valued residual sample producing means comprises:

means having respective input terminals responsive to said residual samples and said selection control signals for producing the sum of said corresponding residual samples; and dividing means having a dividend input responsive to said sum, having a quotient output, and having a divisor input responsive to said selection control signals, for dividing said sum by a predetermined dividing factor to produce said average valued residual sample.

16. Apparatus of claim 15, wherein said sum producing means comprises:

a plurality of AND gate means, having respective first input terminals responsive to mutually different residual samples and each having a second input terminal responsive to a corresponding selection control signal and each having a data output terminal; and summing means having respective input terminals coupled to said data output terminals of said plurality of AND gate means, for producing said sum.

* * * * *